(12) United States Patent
Wei et al.

(10) Patent No.: US 9,413,032 B2
(45) Date of Patent: Aug. 9, 2016

(54) MIXTURE, A SLURRY FOR AN ELECTRODE, A BATTERY ELECTRODE, A BATTERY AND ASSOCIATED METHODS

(75) Inventors: Di Wei, Cambridgeshire (GB); Teuvo Tapani Ryhänen, Cambridge (GB); Piers Andrew, Cambridge (GB); Markku Antti Kyösti Rouvala, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 194 days.

(21) Appl. No.: 13/315,339

(22) Filed: Dec. 9, 2011

(65) Prior Publication Data

US 2013/0149585 A1    Jun. 13, 2013

(51) Int. Cl.

| H01M 4/02 | (2006.01) |
|---|---|
| H01M 4/82 | (2006.01) |
| H01M 10/00 | (2006.01) |
| H01M 10/0525 | (2010.01) |
| H01M 4/04 | (2006.01) |
| H01M 4/13 | (2010.01) |
| H01M 4/62 | (2006.01) |

(52) U.S. Cl.
CPC ........ *H01M 10/0525* (2013.01); *H01M 4/0404* (2013.01); *H01M 4/13* (2013.01); *H01M 4/62* (2013.01); *H01M 4/625* (2013.01); *H01M 2220/30* (2013.01); *H01M 2300/0045* (2013.01); *Y02E 60/122* (2013.01); *Y10T 29/49204* (2015.01)

(58) Field of Classification Search
USPC .............................................. 429/207, 231.1
See application file for complete search history.

(56) References Cited

U.S. PATENT DOCUMENTS

| 7,316,866 | B2 * | 1/2008 | Yong et al. ................. 429/231.1 |
| 7,582,380 | B1 * | 9/2009 | Dunstan et al. ............... 429/188 |
| 2005/0287441 | A1 * | 12/2005 | Passerini ................ H01B 1/122 |
| | | | 429/307 |
| 2008/0241705 | A1 | 10/2008 | Wakita et al. |
| 2008/0268348 | A1 * | 10/2008 | Katoh ........................... 429/323 |
| 2009/0169984 | A1 * | 7/2009 | Liang et al. .................. 429/129 |
| 2010/0075222 | A1 | 3/2010 | Watanabe |
| 2010/0255383 | A1 * | 10/2010 | Kofinas et al. ............... 429/317 |
| 2011/0287316 | A1 * | 11/2011 | Lu et al. ........................ 429/215 |
| 2012/0082901 | A1 | 4/2012 | Schmidt et al. ............... 429/308 |

FOREIGN PATENT DOCUMENTS

| DE | 102004044478 | * | 3/2006 |
| EP | 1689016 A1 | | 8/2006 |
| EP | 2261934 A1 | | 12/2010 |
| JP | 2011249152 A | | 12/2011 |
| WO | WO 2005/064712 A1 | | 7/2005 |

OTHER PUBLICATIONS

Seki, S., et al.; "Imidazolium-Based Room-Temperature Ionic Liquid for Lithium Secondary Batteries; Effects of Lithium Salt Concentration"; Journal of the Electrochemical Society, 154 (3) A173-A177 (2007).

* cited by examiner

*Primary Examiner* — Daniel Gatewood
(74) *Attorney, Agent, or Firm* — Harrington & Smith

(57) ABSTRACT

A mixture including a room temperature ionic liquid; and a reversible source/sink of lithium ions. The mixture may be used as a lithium-ion battery electrode slurry enabling flexible lithium-ion batteries.

11 Claims, 2 Drawing Sheets

MIXTURE, A SLURRY FOR AN ELECTRODE, A BATTERY ELECTRODE, A BATTERY AND ASSOCIATED METHODS

TECHNOLOGICAL FIELD

Embodiments of the present invention relate to a mixture, a slurry for an electrode, a battery electrode, a battery and associated methods. In particular, they relate to a mixture, a slurry for an electrode, a battery electrode, or a battery for exploiting Li-ion electrochemistry.

BACKGROUND

Li ion rechargeable batteries are now common, in particular, because they have a high energy capacity and no memory effect.

Current Li-ion batteries can suffer significant damage if bent or flexed.

It would be desirable to enable provision of a Li-ion battery than is more robust.

BRIEF SUMMARY

According to various, but not necessarily all, embodiments of the invention there is provided a mixture comprising: a room temperature ionic liquid; and a reversible source/sink of lithium ions.

According to various, but not necessarily all, embodiments of the invention there is provided a slurry, for manufacturing a lithium-ion battery electrode, comprising the mixture.

According to various, but not necessarily all, embodiments of the invention there is provided a slurry, for manufacturing a lithium-ion battery cathode, comprising the mixture.

According to various, but not necessarily all, embodiments of the invention there is provided a slurry, for manufacturing a lithium-ion battery anode, comprising the mixture.

According to various, but not necessarily all, embodiments of the invention there is provided a battery comprising: one or more electrodes comprising the mixture. The battery may be flexible.

According to various, but not necessarily all, embodiments of the invention there is provided a composition consisting of: a room temperature ionic liquid; and a reversible source/sink of lithium ions.

According to various, but not necessarily all, embodiments of the invention there is provided a composition consisting of: a room temperature ionic liquid; a reversible source/sink of lithium ions; and conductive carbon additives.

According to various, but not necessarily all, embodiments of the invention there is provided a method comprising: mixing a room temperature ionic liquid; and a reversible source/sink of lithium ions to form a mixture.

The term 'room temperature ionic liquid' may refer to a single species of room temperature ionic liquid or to a mixture of different species of room temperature ionic liquids.

BRIEF DESCRIPTION

Figure 1:
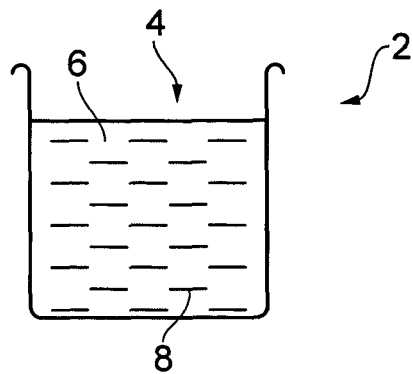
Figure 2:
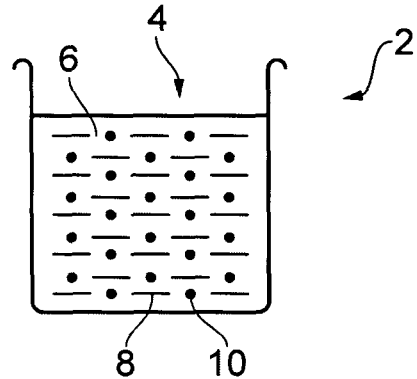
Figure 3A:
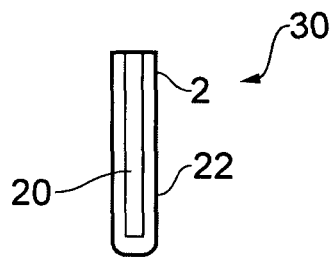
Figure 3B:
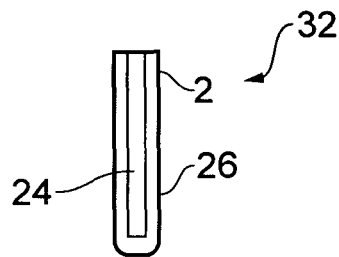
Figure 4:
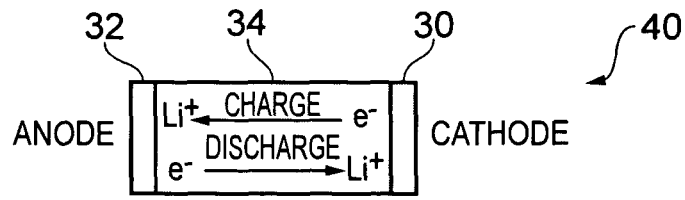
Figure 4:
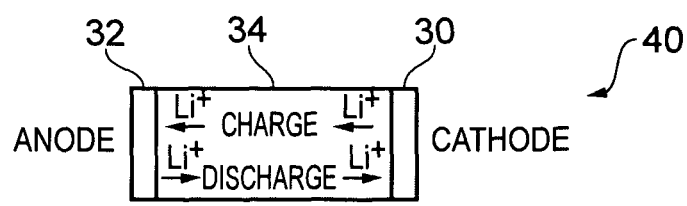
Figure 5:
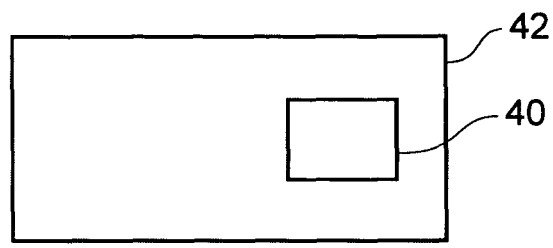

For a better understanding of various examples of embodiments of the present invention reference will now be made by way of example only to the accompanying drawings in which:

FIG. 1 schematically illustrates a mixture comprising: a room temperature ionic liquid and a reversible source/sink of lithium ions;

FIG. 2 illustrates a mixture consisting of the room temperature ionic liquid, the reversible source/sink of lithium ions and a carbon additive;

FIG. 3A schematically illustrates a battery cathode electrode;

FIG. 3B schematically illustrates a battery anode electrode;

FIG. 4 schematically illustrates a lithium-ion battery;

FIG. 5 schematically illustrates an apparatus comprising the battery.

DETAILED DESCRIPTION

The Figures illustrate a mixture 4 comprising: a room temperature ionic liquid 6; and a reversible source/sink 8 of lithium ions. The mixture 4 forms a slurry 2.

The slurry 2 may be suitable for forming electrodes of a lithium-ion battery. This can enable thinner, flexible and/or safer batteries.

The term 'room temperature ionic liquid' may refer to a single species of room temperature ionic liquid or to a mixture of different species of room temperature ionic liquids.

FIG. 1 schematically illustrates a mixture 4 comprising: a room temperature ionic liquid 6; and a reversible source/sink 8 of lithium ions.

A component 8 is added to a room temperature ionic liquid to form the mixture 4. This mixture 4 can, for example, be used as a slurry 2 to coat an electrode of a battery. The additional component 8 is a reversible source/sink of lithium ions during charging/discharging of the battery.

One example of such a source/sink 8 would be a cathode additive 8 that acts as a source of lithium ions when charging occurs and a sink of lithium ions when discharging occurs. An example of a cathode additive 8 is a lithium salt e.g. a compound oxide of lithium.

Another example of such a source/sink 8 would be an anode additive 8 that acts a sink of lithium ions when charging occurs and a source of lithium ions when discharging occurs. An example of an anode additive 8 is carbon.

One or more room temperature ionic liquids 6 may be mixed with a cathode additive 8 to form a battery cathode slurry 2 that is suitable for use at a cathode of a battery.

One or more room temperature ionic liquids 6 may be mixed with an anode additive 8 to form a battery anode slurry 2 that is suitable for use at an anode of a battery. The one or more room temperature ionic liquids 6 used to make a battery anode slurry may be the same or different to the one or more room temperature ionic liquids used to make a battery cathode slurry.

A room temperature ionic liquid 6 is an ionic compound that is liquid at room temperature (e.g. 5-25° C.) and is preferably liquid at ambient external temperatures (e.g. −20 to 40° C.).

The room temperature ionic liquid (RTIL) is, in this example, electrically conductive and has a high boiling point. The room temperature ionic liquid may for example have a boiling point in excess of the flash point of lithium metal (179° C.) it may for example have a boiling point in excess of 200° C.

The room temperature ionic liquid has bulky, asymmetric cations. Typically a cation is selected from the group comprising: immidazolium, pyrazolium, pyridazinium, ammonium, phosphonium, pyridinium.

Typically, the room temperature ionic liquid has an anion selected from the group comprising: halogen, tetrafluoroborate, hexafluorophosphate and trifluoromethylsulfonylimide.

The mixture 4 does not comprise any organic material other than, possibly, cations of the room temperature ionic liquid 6. The mixture 4 does not comprise any insulating polymer binders.

In some embodiments, the mixture 4 consists of the room temperature ionic liquid 6 and the reversible source/sink 8 of lithium ions. That is the mixture 4 has no components other than the room temperature ionic liquid 6 and the reversible source/sink of lithium ions.

In other embodiments, the mixture 4 comprises but does not consist of the room temperature ionic liquid 6 and the reversible source/sink of lithium ions. That is, the mixture 4 has additional components other than the room temperature ionic liquid 6 and the reversible source/sink 8 of lithium ions. For example, the mixture 4 may comprise or consist of the room temperature ionic liquid 6, the reversible source/sink 8 of lithium ions and an additive.

FIG. 2 illustrates a mixture 4 consisting of the room temperature ionic liquid 6, the reversible source/sink 8 of lithium ions and a conductive carbon additive 10.

The conductive carbon additives 10 may include one or more of: carbon nanoparticles, carbon nanotubes, graphene particles etc.

FIG. 3A, 3B schematically illustrates battery components 30, 32 manufactured using a slurry 2 as described with reference to FIGS. 1 and 2. The slurry 2 may have a consistency similar to a paste but with enough fluidity to be spin-coated, printed or applied by some other automated process to a conductive electrode sub-structure 20, 24.

FIG. 3A schematically illustrates a battery cathode electrode 30. A battery cathode electrode 30 is an electrode configured for use as a cathode of a battery, a lithium-ion battery in this example.

The battery cathode electrode 30 comprises a conductive sub-structure 20 coated with a battery cathode slurry 22. The battery cathode slurry 22 is a slurry comprising the mixture 4. The mixture 4 comprises a room temperature ionic liquid 6 and a cathode additive 8 as described above The battery cathode slurry 22 is configured to adhere to the sub-structure 20, which may be metal.

In this example, the battery cathode slurry 22 is formed from a mixture 4 of room temperature ionic liquid 6 and lithium oxide 8. The mixture 4 has a single phase as the lithium oxide 8 dissolves in the room temperature ionic liquid 6. The weight ratio of room temperature ionic liquid 8 to cathode additive 8 may be in the range 1:10 to 3:1.

A non-exhaustive list of alternative cathode additives includes compound lithium oxides such as LiFePO4, LiCoO2, LiMnox and sulphur.

FIG. 3B schematically illustrates a battery anode electrode 32. A battery anode electrode 32 is an electrode configured for use as an anode of a battery, a lithium-ion battery in this example.

The battery anode electrode 32 comprises a conductive sub-structure 24 coated with a battery anode slurry 26. The battery anode slurry 26 is a slurry comprising a mixture 4. The mixture 4 comprises a room temperature ionic liquid 6 and an anode additive 8 as described above.

The battery anode slurry 26 is configured to adhere to the sub-structure 24, which may be metal.

In this example, the battery anode slurry 26 is formed from a mixture 4 of room temperature ionic liquid 6 and carbon 8. The mixture 4 has two separate phases as the carbon particles do not dissolve but are suspended. The weight ratio of room temperature ionic liquid to anode additive 8 may be in the range 1:10 to 3:1.

A non-exhaustive list of alternative anode additives includes, carbon, TiTiO x, Si etc.

FIG. 4 schematically illustrates an example of a lithium-ion battery 40. The battery comprises an anode 32, a cathode 30 and an electrolyte 34 between the anode 32 and cathode 30. An example of a suitable anode 32 has been described with reference to FIG. 3B. An example of a suitable cathode 30 has been described with reference to FIG. 3A.

The upper drawing in the Figure illustrates electron movement during charging and discharging. The lower drawing illustrates lithium ion movement during charging and discharging. The anode 32 operates as a sink for lithium ions during charging and a source of lithium ions during discharging. The cathode 30 operates as a source for lithium ions during charging and a sink of lithium ions during discharging.

The lithium-ion battery 40 is rechargeable as the process of sinking and sourcing lithium ions at the anode 32 and cathode 30 is reversible.

The battery 40 is charged by passing an electric current (internally) from anode 32 to cathode 32. Electron injection at the cathode results in the sourcing of lithium ions. Electron capture (intercalation) at the anode results in the sinking of lithium ions.

During discharge, at the anode 32, electron injection and the sourcing (de-intercalation) of lithium ions occurs and, at the cathode 30, electron capture and the sinking of lithium ions occurs. An electric current (internally) passes from cathode 30 to anode 32.

The battery 40 may be formed as a flexible or bendable battery. The slurry 2 formed in accordance with embodiments of the invention using a room temperature ionic liquid 6 is particularly robust. Such a slurry when used as an battery electrode coating 22, 26 is resistant to degradation when the battery electrode 30, 32 is flexed or bent. This enables the production of a flexible lithium-ion battery 40 having a rechargeable charge capacity of greater than 1000 mAh comprising: a flexible cathode electrode 30 and a flexible anode electrode 32.

The battery 40 may be considerably safer than a standard lithium-ion battery. The electrodes formed using the slurry 2 do not ignite easily.

FIG. 5 schematically illustrates an apparatus 42 comprising the battery 40 previously described with reference to FIG. 4. The apparatus 42 may, for example, be an electronic apparatus. It may, for example, be an apparatus that needs to draw large amounts of power over short timescales (days) or moderate amounts of power over longer timescales (days). The capacity of the battery 40, may for example, be in excess of 1000 mAh or even 1500 mAh.

The apparatus 42 may be a bendable of flexible apparatus and the battery 40 may be a bendable or flexible battery.

The apparatus 42 may be a personal apparatus that is kept with a person such as a mobile cellular telephone, personal digital assistant, personal media player etc.

The apparatus 42 may be a hand-portable apparatus that is sized to fit in the palm of a user's hand or inside a jacket pocket.

Alternatively, the apparatus 2 may be a vehicle such as an automobile.

FIGS. 1 and 2, not only schematically illustrate the mixture 4 but also a method of forming the mixture. The method comprises: mixing a room temperature ionic liquid 6; and a reversible source/sink 8 of lithium ions to form a mixture 4.

FIGS. 3A and 3B also schematically illustrate a method of coating a metal electrode component (sub-structure 20, 24) with the mixture 4.

FIG. 4 also schematically illustrates a method of using the mixture 4 to form an anode 32 of a battery 40. FIG. 4 also schematically illustrates a method of using the mixture 4 to form a cathode 30 of a battery 40.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A battery comprising:
   one or more electrodes comprising:
   a mixture comprising:
   a room temperature ionic liquid;
   a reversible source/sink of lithium ions; and
   conductive carbon additives,
   the conductive carbon additives comprising at least one of:
   carbon nanoparticles;
   carbon nanotubes;
   graphene particles,
   wherein the mixture does not comprise any organic material other than cations of the room temperature ionic liquid.

2. A battery as claimed in claim 1, wherein the battery is flexible.

3. A method comprising:
   mixing a room temperature ionic liquid;
   a reversible source/sink of lithium ions; and
   conductive carbon additives,
   the conductive carbon additives comprising at least one of:
   carbon nanoparticles;
   carbon nanotubes;
   graphene particles,
   wherein the mixture does not comprise any organic material other than cations of the room temperature ionic liquid;
   to form a mixture; and
   using the mixture to form an electrode of a battery.

4. A method as claimed in claim 3 comprising:
   coating a metal electrode component with the mixture.

5. A flexible lithium-ion battery having a rechargeable charge capacity of greater than 1000 mAh, comprising:
   a flexible electrode, wherein the flexible electrode is formed using a mixture comprising:
   a room temperature ionic liquid;
   a reversible source/sink of lithium ions; and
   conductive carbon additives,
   the conductive carbon additives comprising at least one of:
   carbon nanoparticles;
   carbon nanotubes;
   graphene particles,
   wherein the mixture does not comprise any organic material other than cations of the room temperature ionic liquid.

6. A battery as claimed in claim 1, wherein the ratio of room temperature ionic liquid to reversible source/sink of lithium ions is 1:10 to 3:1.

7. A method as claimed in claim 3, wherein the ratio of room temperature ionic liquid to reversible source/sink of lithium ions is 1:10 to 3:1.

8. A flexible lithium-ion battery as claimed in claim 5, wherein the ratio of room temperature ionic liquid to reversible source/sink of lithium ions is 1:10 to 3:1.

9. A battery comprising:
   one or more electrodes comprising:
   a mixture consisting of:
   a room temperature ionic liquid;
   a reversible source/sink of lithium ions; and
   conductive carbon additives.

10. A method comprising:
    mixing a room temperature ionic liquid, a reversible source/sink of lithium ions, and conductive carbon additives to form a mixture, the mixture consisting of: a room temperature ionic liquid; a reversible source/sink of lithium ions; and conductive carbon additives; and
    using the mixture to form one or more electrodes of a battery.

11. A flexible lithium-ion battery having a rechargeable charge capacity of greater than 1000 mAh, comprising:
    a flexible electrode, wherein the flexible electrode is formed using a mixture consisting of:
    a room temperature ionic liquid;
    a reversible source/sink of lithium ions; and
    conductive carbon additives.

* * * * *